(12) United States Patent
Lee (10) Patent No.: US 6,513,153 B1
(45) Date of Patent: Jan. 28, 2003

(54) AUTOMATICALLY INTEGRATING AND EXECUTING APPLICATION SOFTWARE MODULES

(75) Inventor: Elliott Lee, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/261,945

(22) Filed: Mar. 3, 1999

(51) Int. Cl.$^7$ ................................................. G06F 9/44
(52) U.S. Cl. ...................... 717/100; 717/162; 717/166
(58) Field of Search ............................ 717/1, 100, 162, 717/166; 707/10; 709/206, 218, 227, 203

(56) References Cited

U.S. PATENT DOCUMENTS

| | | | |
|---|---|---|---|
| 5,706,434 A | * 1/1998 | Kremen et al. | 709/218 |
| 5,732,219 A | * 3/1998 | Blumer et al. | 709/227 |
| 5,793,966 A | * 8/1998 | Amstein et al. | 709/203 |
| 6,298,481 B1 | * 10/2001 | Kosaka et al. | 717/162 |

FOREIGN PATENT DOCUMENTS

| EP | 0 629 950 A1 | * 7/1994 | 717/11 |
|---|---|---|---|

OTHER PUBLICATIONS

"PERL by Example" Second Edition, Ellie Quigley, 1997, pp. xiii–11, 157–239, 392, 415–465,486.*

"UNIX Shell Programming", Third Edition, L.J. Arthur et al. 1994, pp. 99–133, 288–294.*

* cited by examiner

Primary Examiner—Kakali Chaki
Assistant Examiner—Todd Ingberg
(74) Attorney, Agent, or Firm—Marcel K. Bingham; Hickman Palermo Truong & Becker LLP

(57) ABSTRACT

A method and apparatus are provided for automatically integrating and executing application software modules. An application selects those software modules from a pool of software modules that match a particular criteria. For example, selection criteria may be that a software module be stored in files with file names that match a pre-defined character pattern. If the software module is configured so that it may be run by the application, then the application runs the software module. A software module invokes an application-supplied function that provides an output buffer. The software module may generate HTML code and store the code in the output buffer.

25 Claims, 6 Drawing Sheets

AUTOMATICALLY INTEGRATING AND EXECUTING APPLICATION SOFTWARE MODULES

FIELD OF THE INVENTION

The invention generally relates to data processing. The present invention relates more specifically to integrating and executing software modules in an application.

BACKGROUND OF THE INVENTION

Computer programs or applications may be formed of one or more software modules which mutually depend on each other. The software modules may be developed by different developers who may reside at different sites or work for different companies. The developers must coordinate their development efforts, to ensure that the dependencies of each of the software modules are met, and that the software modules may be integrated to operate together in a working application. The increasing complexity of modern applications often results in an increased quantity of software modules per application and an increased dependency between the software modules.

The term software module, as used herein, refers to computer programs, sections of a program, or data used by computer programs, and is not limited to programs developed in any particular computer language. The term application refers to a set of multiple software modules or programs that cooperate to carry out useful functions. The term application integration refers to the process of integrating software modules into an operable application.

An example of one of many possible dependencies that may exist between the software modules of an application is the use of correct reference names and storage locations for the software modules. The correct reference names and locations are needed so that the modules may be loaded and run correctly by the application. For example, an application "APP" includes a main software module "MAIN". MAIN is used to invoke the other software modules ("APP modules") that, at least in part, form the application. MAIN includes code which, when executed, loads and runs the APP modules. This code explicitly refers to each APP module. An explicit reference is code or data which is used to either identify a particular module, locate a particular module, or both. For example, MAIN may contain the code "run moduleA". The reference "moduleA" explicitly refers to a particular software module. When code to carry out "run moduleA" is executed by MAIN, module A is loaded and then executed. Alternatively, a reference may contain information that explicitly identifies the location of a module to run. For example, the code "load c:/Programs Files/APP/moduleA" explicitly identifies the file location of the file containing the code for moduleA.

As the application developers develop APP, they must coordinate their development efforts in order to integrate the application software modules. Such coordination includes communicating, to the developers of MAIN, the references to each of the APP modules and their locations at runtime. Only when this information is received, the developers of MAIN can program MAIN. The developed code includes, for the purpose of running and executing the APP modules, instructions referencing each of the APP modules.

Typically, applications are developed in cycles, each new cycle producing a new version of the application that enhances features provided by previous versions. For example, each new version of the application includes a version of APP. The new version may incorporate a different set of APP modules, or versions of APP modules.

To ensure that the software modules operate together as an integrated unit, each version may undergo integration testing. Application integration testing entails installing software modules that form an application as a integrated unit on a computer system. The application is run and subjected to various test input or data. As tests are performed, errors are found, corrections are made, and the application is reformed and installed as an integrated unit on a computer system for further integration testing.

As the quantity of APP modules increases, application integration between developers becomes more complex and burdensome to the developers. In addition, numerous versions of the application add further to the complexity and burden of application integration.

One approach to managing the complexity and burden of application integration is the configuration management approach. Under the configuration management approach, personnel are dedicated to application integration. The staff may use software tools ("configuration tools"), that assist in the configuration process and manage application integration. Configuration tools may include mechanisms for tracking the dependencies of a particular version of an application, for example, what APP modules MAIN invokes and what directory to store the APP modules. Configuration tools may also include a mechanism for determining whether a particular set of software modules satisfies the dependencies of a particular version of an application, for example, whether a set of modules includes a particular version of APP and a particular version of a set of APP modules, and whether the APP modules reside at the appropriate location.

Once a version of an application is tested, it is typically installed on multiple computer systems, such as computer systems used for testing and the computer systems operated by end users. Typically during application integration testing, configuration tools are used to automatically form an application so that it may tested by testers.

The process of installing an application on another computer system operated by an end user is referred to as deployment. Deployment involves verifying that various application dependencies are met once a version of an application is installed at a site. For example, deployment of a particular version of APP may involve, verifying that a particular site has the proper version of MAIN and the proper version of the APP modules. Deployment of an application becomes more burdensome as the dependencies of an application increase.

One approach for deployment is the installation module approach. Under the installation module approach, a software module runs at a site. The software module automatically ensures that the application dependencies have been met on the computer system on which the application is being installed and installs the software modules that form the application. Typically, configuration management personnel develop the installation modules, using configuration tools to at least partially automate the development of the installation module.

While the configuration management approach facilitates application integration, integration testing, and deployment, the configuration management approach is time-consuming and expensive. The approach requires dedication of significant resources in the form of software, computer systems, and personnel. Often, the duties of the configuration management personnel require that they possess software expertise, further increasing the cost of personnel qualified to perform configuration management tasks.

In addition, while the configuration management approach reduces the amount of work that developers of software modules expend in the task of application integration, the developers' participation in application integration not eliminated. The developers may have to communicate the dependencies of their software modules to configuration management personnel. To address dependencies that may only be resolved by programming particular software modules in a particular manner, developers coordinate their efforts, deciding how software modules depend on each other and communicating these dependencies. For example, the developers of an APP module may have to communicate, to the developers of MAIN, the runtime location and reference to use to load and run the APP module. Furthermore, the configuration test does not eliminate the need to perform application integration testing.

Based on the foregoing, it is clearly desirable to provide a mechanism that reduces the dependencies between software modules of an application. In particular, there is a clear need to reduce the amount of application integration testing. There is also a need to reduce the requirement to explicitly reference the software modules in order to load and run the software modules of an application.

SUMMARY OF THE INVENTION

A method and mechanism for automatically integrating and executing application software modules is described. According to an aspect of the present invention, an application selects those software modules from a pool of software modules that match a particular criteria. For example, selection criteria may be that a software module be stored in files with file names that match a pre-defined character pattern.

According to another aspect of the present invention, if the software module is configured so that it may be run by the application, then the application runs the software module. A software module invokes an application-supplied function that provides an output buffer. The software module may generate HTML code and store the code in the output buffer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for automatically integrating and executing application software modules of an application is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Figure 1:
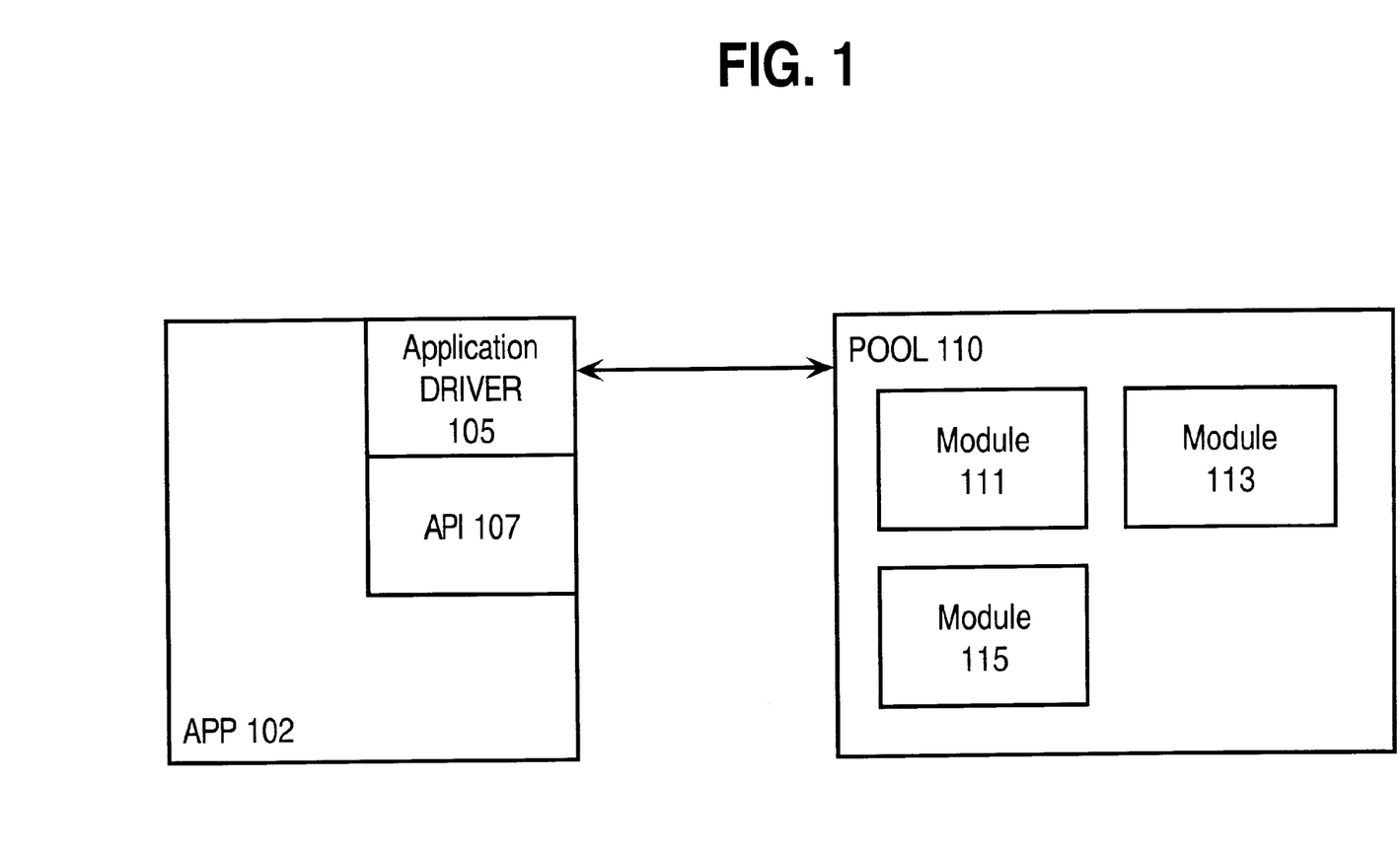
FIG. 1 is block diagram depicting an exemplary application architecture according to an embodiment.

FIG. 1 is an exemplary application architecture according to one embodiment. Referring to FIG. 1, application 102 includes an Application Driver 105 and an application programmers interface ("API") 107. Application Driver 105 selects software modules from pool of software modules 110 based on selection criteria. An application driver is a software module used to run other software modules that, at least in part, form an application. An application may have more than one application driver. Application Driver 105 loads and runs software modules selected from the pool 110 if the software module is configured so that it may be run by the application driver 105. Pool 110 is a group or collection of software modules stored in one or more known locations. Pool 110 includes software modules 111, 113, and 115. Software modules 111, 113, 115 may be stored as one or more files in a file directory. An API is a set of functions or procedures through which the services provided by an application may be obtained.

Application Driver 105 selects those software modules from pool 110 that match selection criteria. For example, selection criteria may be that a software module be stored in files with file names that match a pre-defined character pattern. If the software module is configured so that it may be run by the Application Driver, then the Application Driver runs or the software module. Each software module invokes an application-supplied function in API 107 that returns a reference to an output buffer. In response to a software module invoking the function, the application allocates an output buffer, and then returns a reference to the output buffer to the software module. The software module may generate HTML code and may store the code in the output buffer.

The Application Driver's ability to load and run software modules without explicitly referencing them, such that, the Application Driver code contains no explicit reference to the software module before runtime, is a feature that facilitates application integration. A software module may be added or removed from the application without modifying the code in any other software module of the application. This reduces application dependencies that must be tracked and accounted for by developers, configuration managers and deployers of an application, thus reducing the effort and cost of application integration. Because new and revised software modules may be added to an application without modifying other software modules comprising the application, software modules may be deployed without the need of generating a new release and round of application integration testing, resulting in further cost reductions.

An embodiment is illustrated using an application written in the Practical Extraction and Report Language ("Perl"). However, use of Perl is not required; any computer language may be used. For example, the pool of software modules may include any software module that may be loaded into memory and interpreted, such as software modules that contain Perl, Quick Basic, HTML and JavaScript, or byte code compiled from Java™ source code, or which may be executed as machine instructions, such as software modules compiled from source code written in C, C++, or Pascal.

Illustrative Application Architecture

Figure 2:
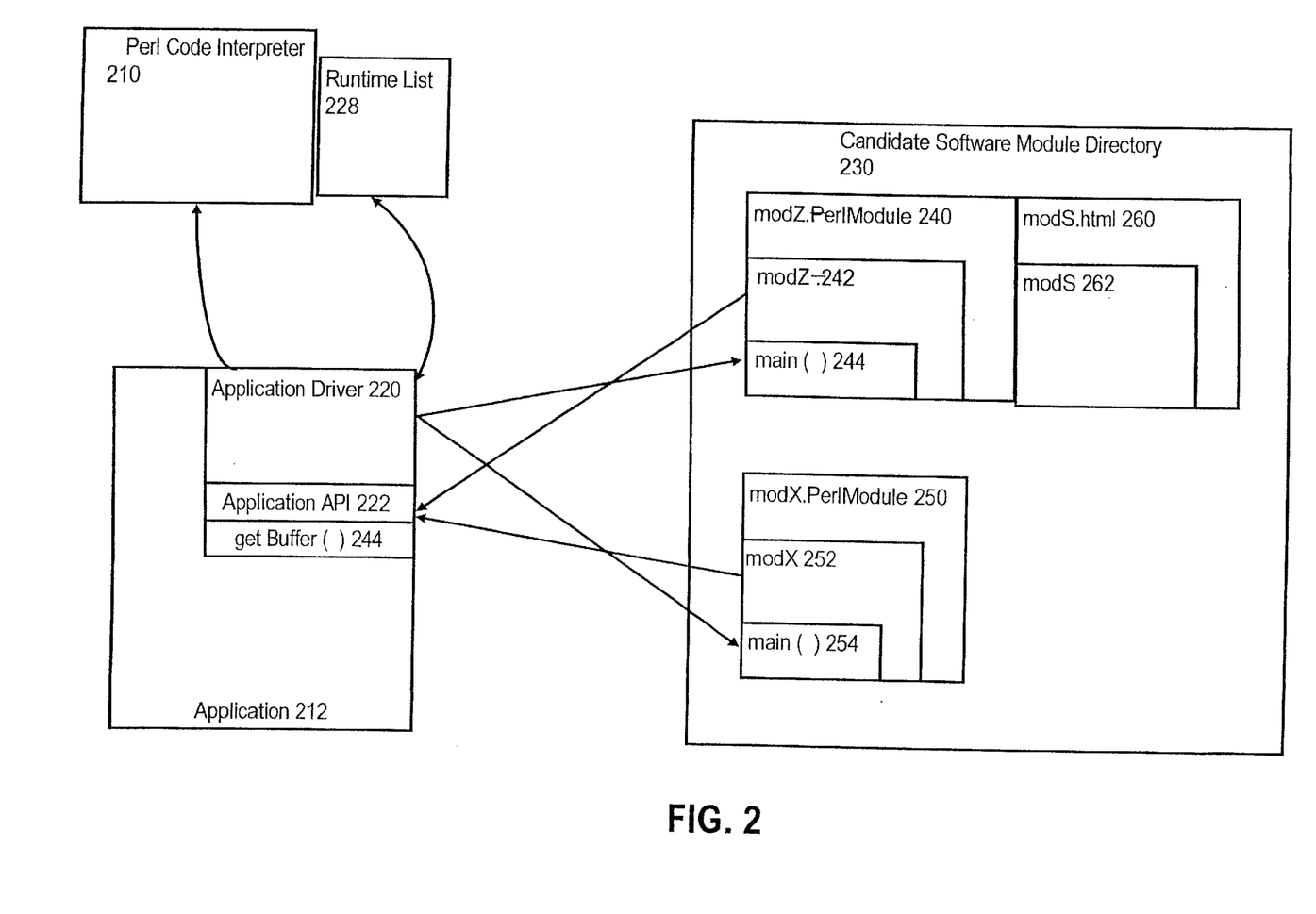
FIG. 2 is a block diagram depicting an exemplary architecture that includes software modules written in the Perl language.

FIG. 2 is a block diagram depicting an illustrative application architecture upon which an embodiment may be implemented. FIG. 2 shows Perl code interpreter 210, which executes modules written in the Perl language. Application 212 is an application formed by software modules written in the Perl language.

Application 212 includes an Application Driver 220, which also may be a software module written in Perl. Application Driver 220 loads and runs candidate software modules that reside in candidate software module directory 230. Candidate modules are a set of programs that may be each be executed by an Application Driver if the software modules match a selection criteria. An example of such criteria is that the software module may be contained in a file having a file name that matches a particular pattern, such as the name including a string suffix such as the characters ".PerlModule". Candidate software module directory 230 may be a directory of a file system of an operating system. It should be noted that for purposes of exposition, illustrative software modules described herein that contain Perl are not named using the Perl standard file extension ".pm".

ModZ.PerlModule 240, ModX.PerlModule 250, and ModS.html 260 are files in candidate software module directory 230. The file names of ModZ.PerlModule 240, ModX.PerlModule 250, and ModS.PerlModule 260 are ModZ.PerlModule, ModX.PerlModule, and ModS.html respectively. ModZ.PerlModule 240, ModX.PerlModule 250, and ModS.html 260 contain software modules ModZ 242, ModX 252, and ModS 262 respectively.

ModZ 242, ModX 252, and ModS 262 may be software modules written in Perl code. ModZ 242, ModX 252, and ModS 262, when executed, may generate HTML code as output The code includes code associated with one or more functions and inline code. The inline code is code contained in software but which is stored in an external module and is outside the scope of any particular function. In addition, ModZ 242 and ModX 252 include a main function which is invoked by Application Driver 220 to run ModZ 242 and ModX 252. ModZ 242 and ModX 252 respectively include functions main( ) 244 and main( ) 254. Application Driver 220 code does not explicitly refer to ModZ 242, ModX 252, and ModS 262.

ModZ 242 and ModX 252 may interact with application 212 through Application Driver API 222. Application Driver API 222 includes a function getBuffer( ) 224. The function getBuffer( )224 returns a reference to an output buffer into which ModZ 242 and ModZ 252 may direct output, such as HTML code. Application Driver API 222 may include other API functions, such as functions that return data about the context in which the application runs.

Selecting Modules that Match a First Criteria

Figure 3:
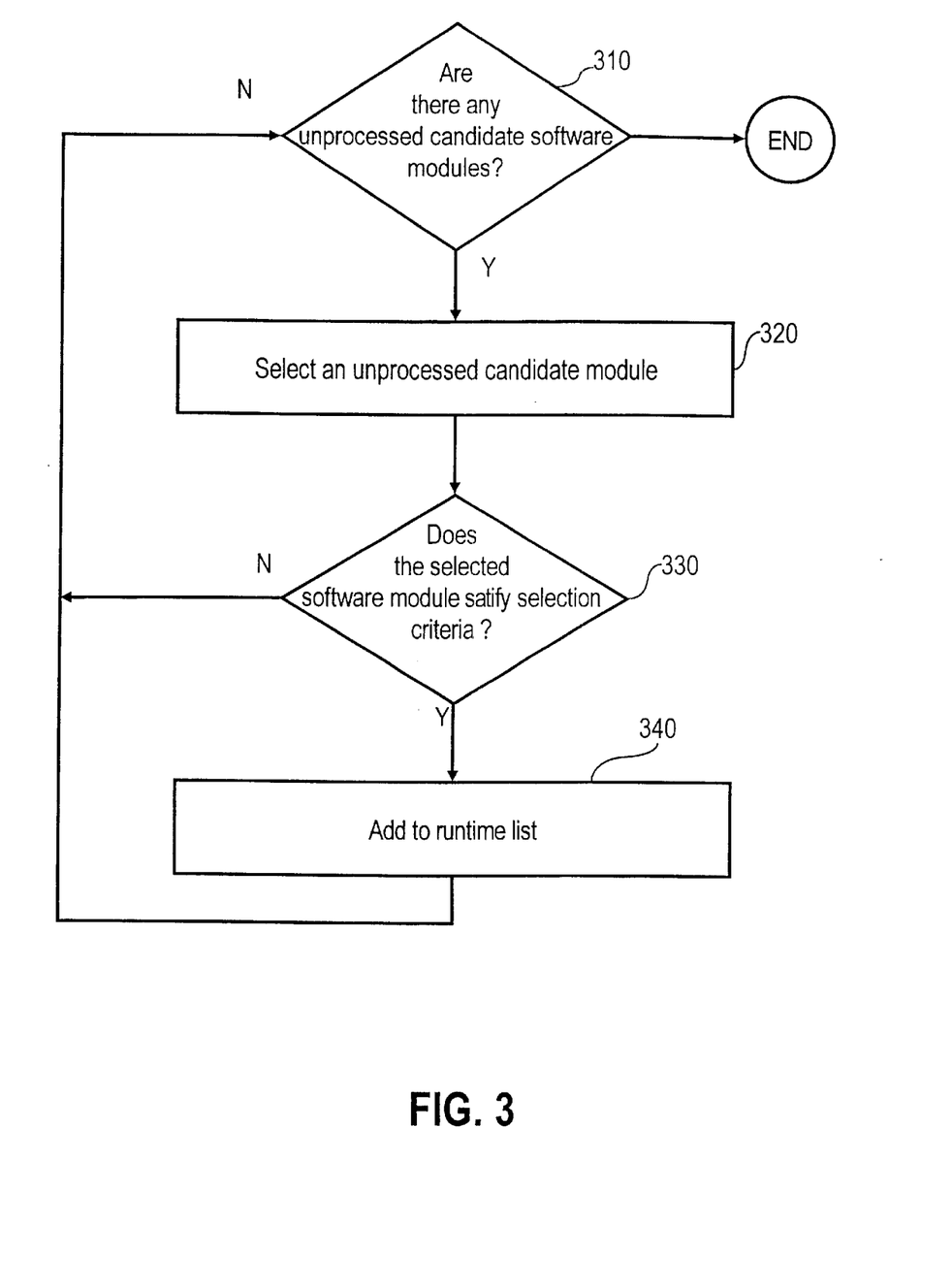
FIG. 3 is a flow chart showing a technique for selecting software modules for subsequent execution.

Before Application Driver 220 loads and runs any candidate program, Application Driver 220 determines which of the candidate software modules match selection criteria. FIG. 3 is a flow diagram of a program of a process to determine which of the candidate software modules match selection criteria. The blocks in FIG. 3 represent a loop in which each cadidate module is selected and examined to determine whether the candidate module satisfies the process.

Because the candidate modules are contained in files in candidate software module directory 230, a candidate module is selected by selecting a file in the directory that contains the candidate software module. In addition, the selection criteria preferably is that a software module be contained in a file that ends with the prefix ".PerlModule". For example, using wild card characters to specify patterns of characters, Application Driver 220 loads and runs software modules contained in files with a file name matching the wildcard string "*.PerlModule".

The blocks of FIG. 3 are described using the illustrative application architecture depicted by FIG. 2.

Referring to FIG. 3, at block 310, it is determined whether there are any unprocessed candidate modules in candidate software module directory 230. For the purposes of block 310, an unprocessed candidate module is a candidate module for which a determination has not been made at block 310 in a particular invocation of the blocks in FIG. 3.

In this example, none of the software modules in candidate software module directory 230 have to be processed in block 310. Therefore, control flows to block 320.

At block 320, one of the unprocessed candidate modules is selected. In this example, modZ 242 in file ModZ.PerlModule 240 is selected. Such selection may be carried out by reading the name of the next file in the candidate software module directory.

At block 330, a determination is made as to whether the selected software module satisfies the selection criteria. If the selected software module satisfies the selection criteria, then control flows to block 340. Otherwise, the module is ignored, and control flows returns to block 310. In this example, modZ 242 is contained in file ModZ.PerlModule 240, which has a file name with the suffix "*.PerlModule". Thus, modZ 242 satisfies the selection criteria, and execution returns to block 310.

At block 340, modZ 242 is added to runtime list 228 (FIG. 2). Block 340 may involve storing the name of the module in a table, list, or other data structure. Control returns to block 310.

Continuing with the current example, at block 340, it is determined that there are unprocessed software modules because ModS.SomeModule 260 and modX.PerlModule 250 have not been selected. At block 320, ModS 262, the candidate module in modS.SomeModule 260, is selected.

At block 330, it is determined that candidate module ModS 262 does not satisfy selection criteria because ModS 262 is contained in a file ModS.html, which does not end in the suffix "*.PerlModule". Therefore, ModS 262 is not added to the runtime list 228 at block 340. Control returns to block 310.

In the manner previously described, Application Driver 220 executes block 310–block 340. At block 340, modX 252 is added to the runtime list.

Loading Software Modules and Verifying that They May Be Run

Figure 4:
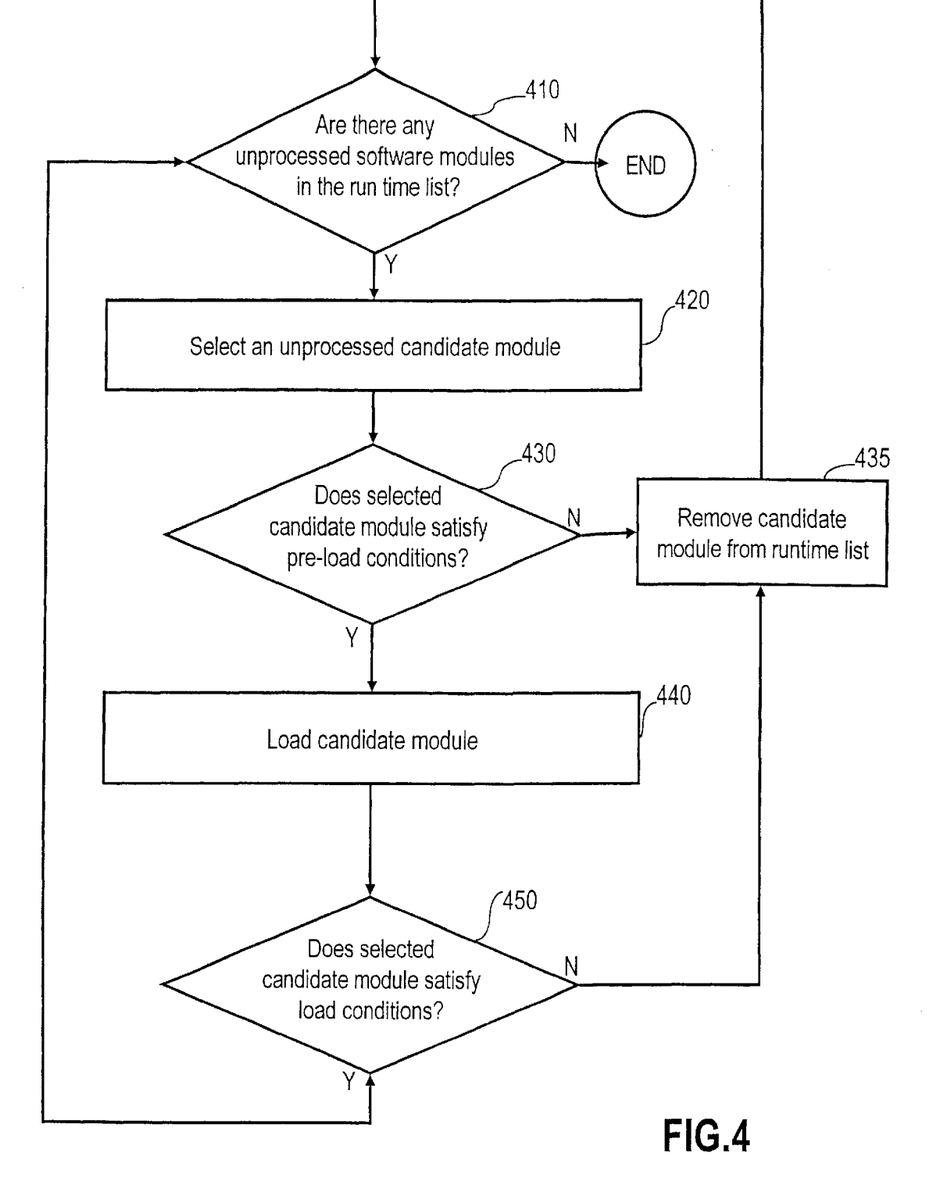
FIG. 4 is a flow chart showing a technique for loading software modules that satisfy pre-load verification conditions and post-load verification conditions.

Before selected candidate modules are run, they must be loaded. In addition, some of the selected candidate modules may not be configured to be run by the Application Driver 220. Therefore, the selected candidate modules are examined to verify whether they have been configured to be run by the Application Driver 220. FIG. 4 shows a process that may be performed to load software modules and verify that they may be run according to an embodiment of the present invention.

The blocks of FIG. 4 are illustrated using the example introduced for illustrating the blocks depicted in FIG. 3.

Referring to FIG. 4, at block 410, it is determined whether there are any unprocessed candidate modules in runtime list 228. For the blocks shown in FIG. 4, an unprocessed candidate module is a candidate module for which a determination has not been made at block 410 in a particular invocation of the process of FIG. 4.

At block 420, one of the unprocessed candidate modules in runtime list 228 is selected. In this example, modZ 242 is selected.

At block 430, it is determined whether the selected candidate module satisfies pre-load verification conditions. Pre-load verification conditions include conditions that indicate whether the candidate module was configured to be run by Application Driver 220. If the selected candidate module does not satisfy pre-load verification conditions, then control flows to block 430, where the selected candidate module is removed from runtime list 228. Otherwise, control flows to block 440.

In this example, the file that contains modZ 242, ModZ.PerlModule 240, is scanned to determine whether it contains a pre-defined string. The pre-defined string may be one which, by prior agreement between developers, is contained in modules developed to be run by Application Driver 220. Because ModZ.PerlModule 240 contains such a string, control flows to block 440.

At block 440, the selected candidate module is loaded. Loading refers to reading a software module and storing it in memory in executable form in preparation for execution. Loading may also include establishing, in memory, data structures needed to store information generated when executing the software module, and may include execution of some code in the software module. In this example, Application Driver 220 loads modZ 242 by invoking the require( ) function of PERL, loading modZ 242 into dynamic memory in a form suitable for subsequent execution, establishing memory data structures in memory, and executing inline code outside the scope of functions defined by modZ 242. In a preferred embodiment, Application Driver 220 contains a require( ) function invocation with a string as the file name argument. The requires function is invoked within a loop that iteratively substitutes the literal name of each module to be loaded, such as "modZ.package.perl," into the filename argument before invoking the requires function.

At block 450, it is determined whether the selected candidate module meets the postload verification conditions. Post-load verification conditions include additional conditions that indicate whether the candidate module was configured to be run by Application Driver 220. In particular, post-load verification conditions may include Application Driver 220 loading the selected software module without the incurring of any load errors, the selected candidate module defining particular data structures in memory and a main function or other functions that may be necessary for Application Driver 220 to run the candidate module. If the post load verification conditions have been met, control returns to block 410, where the selected candidate module is removed from runtime list 228.

In this example, Application Driver 220 loads modZ without incurring any load errors. In addition, Application Driver 220 determines that a MAIN function variable has been defined by ModZ. Control returns to block 410.

In the next iteration of the blocks shown in FIG. 4, ModX 252 is selected and loaded because ModX 252 satisfied the pre-load and post-load verification conditions. Execution of the blocks ceases.

Running Software Modules

Figure 5:
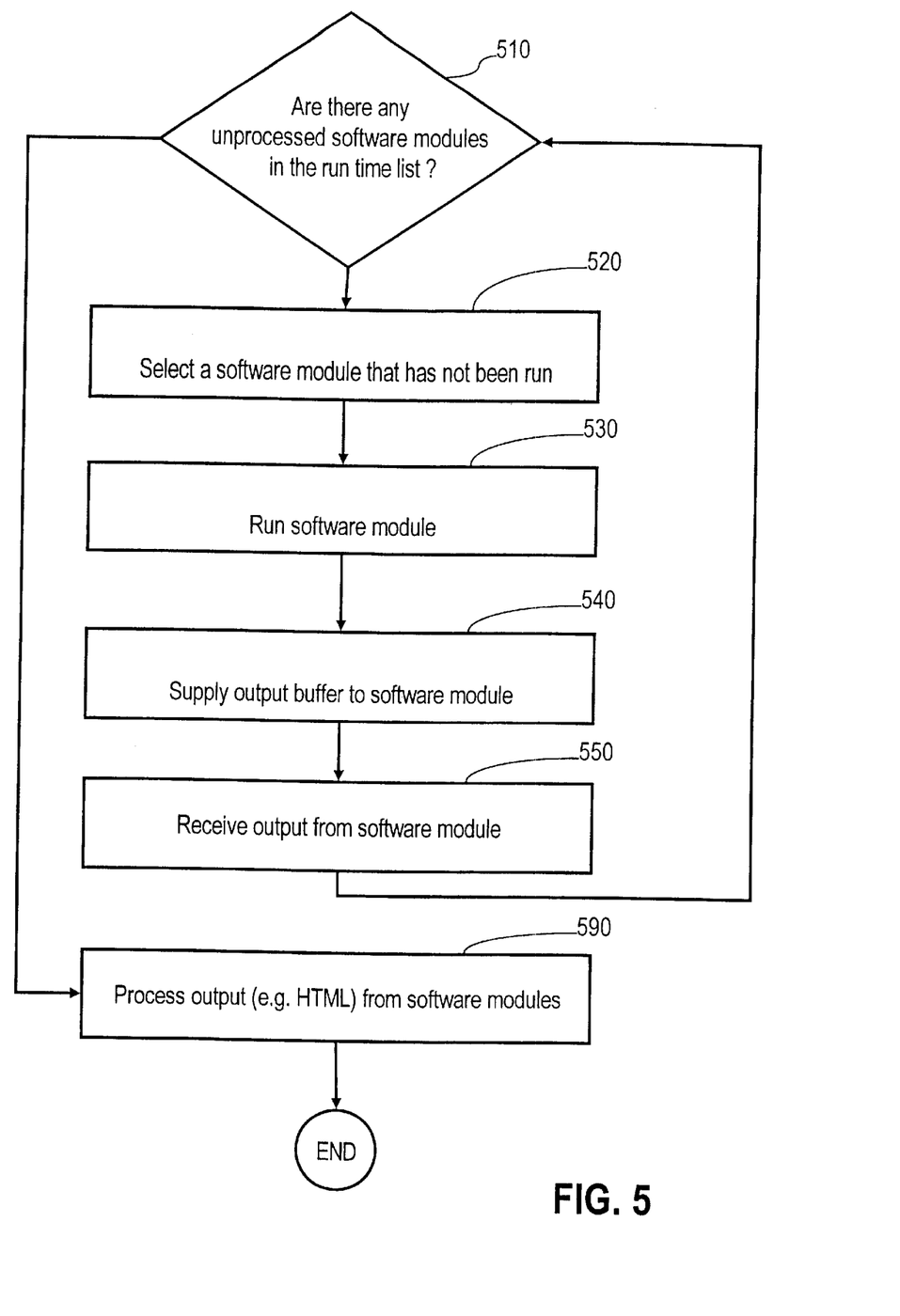
FIG. 5 is a flow chart showing a technique for running selected software modules.

Application Driver 220 is loaded so that it may be run. FIG. 5 shows a process for running the modules. The blocks shown in FIG. 5 represent a loop that runs each of the software modules in runtime list 228. The modules, when run, invoke the function getBuffer 224, which returns a reference to an output buffer dedicated to receiving output from a particular software module.

The process of FIG. 5 is described using the example introduced for illustrating the process depicted in FIG. 3 and FIG. 4.

Referring to FIG. 5, at block 510, it is determined whether there are any unprocessed candidate modules in runtime list 228. For the blocks shown in FIG. 5, an unprocessed candidate module is a candidate module in runtime list 228 for which a determination has not been made at block 510 in a particular invocation of the blocks in FIG. 5. If there are not any unprocessed modules in runtime list 228, control flows to block 590. Otherwise, control flows to block 520.

At block 520, one of the unprocessed candidate modules in runtime list 228 is selected. In this example, modZ 242 is selected.

At block 530, the selected candidate module is run. In this example, Application Driver 220 invokes function main( ) 244 of modZ 242. Execution proceeds to block 540.

At block 540, an output buffer is supplied to the selected candidate module being executed. In this case, function getBuffer( ) 224 is invoked by modZ 242. In response, the Application Driver 220 causes the allocation of memory for an output buffer, and passes to modZ 242 a reference to the output buffer. Execution proceeds to block 550.

At block 550, output is received from the candidate module being executed. In this example, HTML code generated by modZ 242 is received and stored in the just allocated buffer. Execution of the blocks returns to block 510.

In the next iteration of the blocks in FIG. 5, the unprocessed candidate module selected at block 520 is ModX 252, which is run at block 530. At block 540, another output buffer is supplied, this time for ModX 252. At block 550, the just allocated output buffer receives output generated by ModX 252 in the form of HTML code. Control flows to block 510, where it is determined that there are no unprocessed software modules. Control then flows to block 590.

At block 590, the output stored in the just allocated buffer is processed. In this example Application Driver 220 causes an HTML interpreter to execute the code in the two output buffers created for modZ 242 and modX 252 respectively.

Alternate Embodiments

The present invention has been illustrated using software modules written in Perl. However, an embodiment of the present invention may be implemented in software modules written in other languages, such as Java, or in an application that includes software modules written in multiple languages. For example, candidate modules may include a pool of modules contained in multiple file directories. Some of the candidate modules are written in Perl, others are binary executable files written from the C++ program language. Application Driver 220 may interact with the C++ programs through an API generated through the Simplified Wrapper and Interface Generator ("SWIG").

Application Driver 220 generates the runtime list as described earlier, except that the selection criteria is that a candidate module be contained in a file that ends in the suffixes "*.PerlModule" or "cMod.exe". Software modules written in Perl are processed in the manner described previously. The C++ programs are loaded and run through interfaces developed through SWIG.

Application drivers are not be able to load and run some types of software modules as separate operations, but only as a single operation. For example, to run a software module that contains machine executable code, an application driver may make a request to the operating system to run the software module. A separate operation for just loading the software module is not available to the application driver. The operating system automatically loads the software module before running it. In this case, pre-load or post-load verification may not be performed without running the software module, as shown in FIG. 4. Instead, pre-load verification may performed after selecting a module to run at step 520 and before running the module at step 530. If the module fails pre-load conditions, then software module is not run. No post-load verification is performed.

Furthermore, storing candidate modules in one or more file directories is but one pool listing mechanism that may be used to describe the pool of candidate modules. For example, rather than using a file directory to describe a pool of candidate modules, the pool of candidate modules could be described using some other type of aggregate data structures stored in dynamic or static memory.

Hardware Overview

Figure 6:
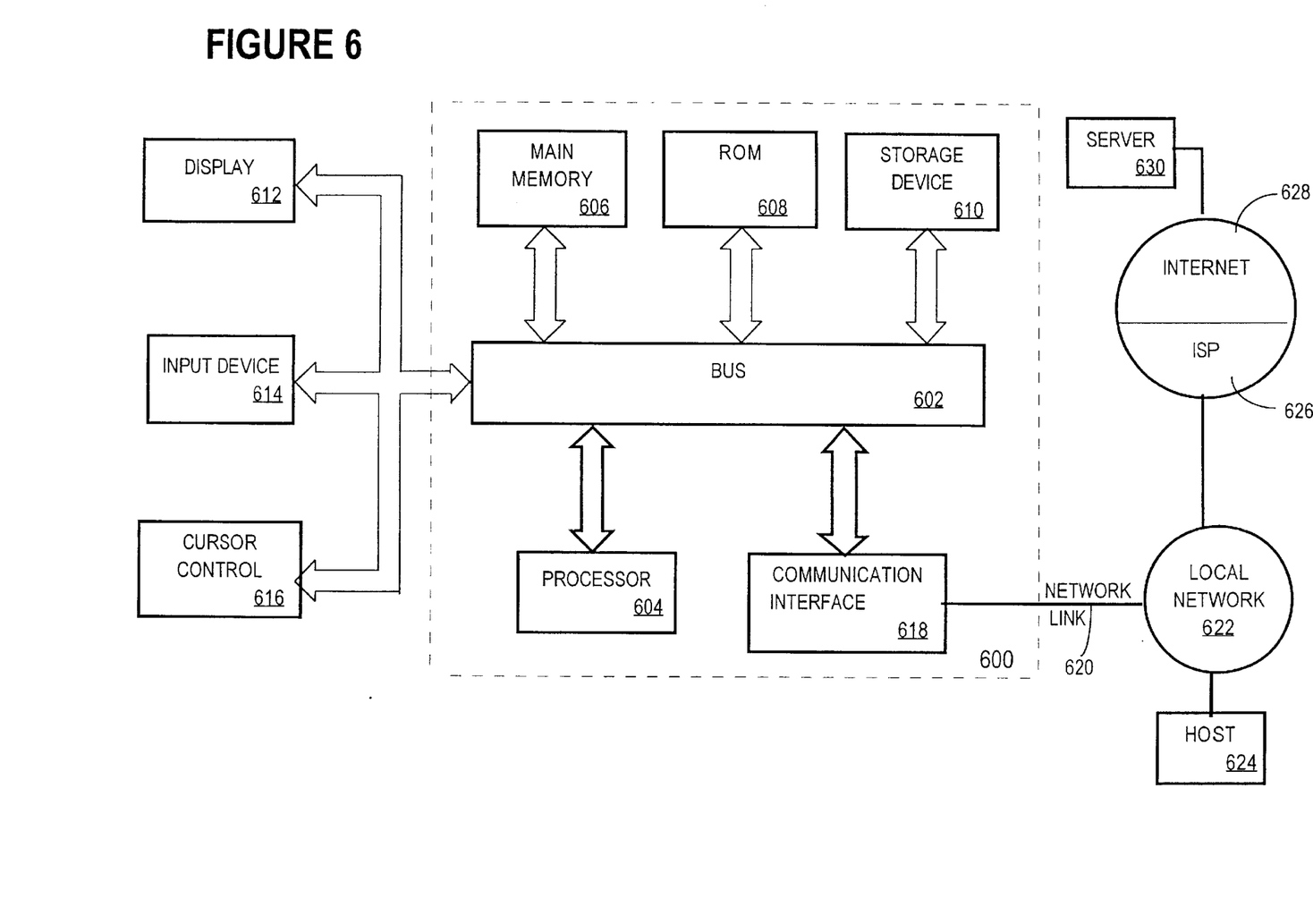
FIG. 6 is an exemplary computer system upon which an embodiment invention may be implemented.

FIG. 6 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for automatically integrating and executing application software modules. According to one embodiment of the invention, a mechanism for running plug and play software modules is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP)

626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for automatically integrating and executing application software modules as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of automatically integrating and executing software modules that are associated with an application program, the method comprising the steps of:
    an application driver within the application program selecting, for execution from a pool of software modules, a plurality of software modules that satisfy a first criterion, wherein said first criterion does not require that any software module of said plurality of software module be explicitly referenced;
    for each software module of said plurality of software modules, performing the following:
        determining whether said each software module satisfies a first condition that indicates that said each software module is configured to be run by said application driver, and
        if said each software module satisfies said first condition, then the application driver loading said each software module, and the application driver executing said each software module; and
    wherein the first condition includes that said each software module contain a pre-defined string of characters.

2. The method of claim 1, wherein the step of selecting includes selecting one or more files that have file names that match a pattern of characters.

3. The method of claim 1, wherein the pool of software modules includes at least one software module written in Perl; and wherein the step of executing includes interpreting the at least one software module written in Perl.

4. The method of claim 3, wherein the step of loading is performed by invoking the require( ) intrinsic function of the Perl language.

5. The method of claim 1, further including the step of establishing an output buffer for said each software module from the pool that is loaded by the application driver.

6. The method of claim 5, wherein the step of establishing an output buffer includes said each software module invoking an API function associated with the application program that returns a reference to the output buffer.

7. The method of claim 5, further including the steps of:
    wherein said application driver executing said each software module causes generation of HTML code; and
    receiving the HTML code in the particular output buffer established for said each software module.

8. The method of claim 1, further including the step of:
    after loading said each software module, determining whether a set of one or more additional conditions are satisfied, said set of one or more additional conditions indicating that said each software module is configured to be run by said application program.

9. The method of claim 8, wherein the step of said application driver executing said each software module is performed only when said each software module satisfies said set of one or more additional conditions.

10. The method of claim 8, wherein said set of one or more additional conditions include that said each software module have a particular function needed by the application program to run said each software module.

11. A method of running software modules of an application, the method comprising the steps:
    storing each software module of a plurality of software modules in a file that has a file name and that is associated with a file directory;
    selecting for execution at least one software module of the plurality of software modules that is stored in a particular file:
        that is associated with the file directory, and
        that has a particular file name satisfying a first criteria;
    verifying that the at least one software module satisfies a set of one or more conditions that indicate that said at least one software module is configured to be run by said application;
    after verifying that the at least one software module satisfies the set of one or more conditions, loading the at least one software module;
    after loading the at least one software module, running the software module; and
    wherein the one or more conditions include that a software module in the particular file include a pre-defined string of characters.

12. A computer-readable medium carrying one or more sequences of one or more instructions for automatically integrating and executing software modules that are associated with an application program, the one or more sequences of one or more instructions including instructions which, when executed by one or more processors, cause the one or more processors to perform the steps of:
    an application driver within the application program selecting, for execution from a pool of software modules, a plurality of software modules that satisfy a first criterion, wherein said first criterion does not require that any software module of said plurality of software module be explicitly referenced;
    for each software module of said plurality of software modules, performing the following:
        determining whether said each software module satisfies a first condition that indicates that said each software module is configured to be run by said application driver, and
        if said each software module satisfies said first condition, then the application driver loading said each software module, and the application driver executing said each software module; and wherein the first condition includes that said each software module contain a pre-defined string of characters.

13. The computer-readable medium of claim 12, wherein the step of selecting includes selecting one or more files that have file names that match a pattern of characters.

14. The computer-readable medium of claim 12, wherein the pool of software modules includes at least one software module written in Perl; and wherein the step of executing includes interpreting the at least one software module written in Perl.

15. The computer-readable medium of claim 12, wherein the step of loading is performed by invoking the require( ) intrinsic function of the Perl language.

16. The computer-readable medium of claim 12, further including the step of establishing an output buffer for said each software module from the pool that is loaded by the application driver.

17. The computer-readable medium of claim 16, wherein the step of establishing an output buffer includes said each software module invoking an API function associated with the application program that returns a reference to the output buffer.

18. The computer-readable medium of claim 16, wherein the steps further include:

wherein said application driver executing said each software module causes generation of HTML code; and receiving the HTML code in the particular output buffer established for said each software module.

19. A computer system comprising:

an application that resides on the computer system and that includes at least one application driver;

a pool of software modules, wherein said application includes no explicit reference to any software module in said pool;

the application driver configured to select one or more software modules from the pool of software modules;

the application driver configured to determine whether said one or more software modules satisfy a first condition that indicates that said one or more software modules are configured to be run by said application driver;

the application driver configured to, when said one or more software modules satisfy said first condition:
load the one or more software modules, and
execute the one or more software modules; and wherein the first condition includes that said each software module contain a pre-defined string of characters.

20. The method of claim 1,
wherein one or software modules of said plurality of software modules contain one or more other software modules.

21. The method of claim 20, wherein said one or more other software modules include one or more functions.

22. A computer-readable medium carrying one or more sequences of one or more instructions for running software modules of an application, the one or more sequences of one or more instructions including instructions which, when executed by one or more processors, cause the one or more processors to perform the steps of:

storing each software module of a plurality of software modules in a file that has a file name and that is associated with a file directory;

selecting for execution at least one software module of the plurality of software modules that is stored in a particular file:

that is associated with the file directory, and
that has a particular file name satisfying a first criteria;

verifying that the at least one software module satisfies a set of one or more conditions that indicate that said at least one software module is configured to be run by said application;

after verifying that the at least one software module satisfies the set of one or more conditions, loading the at least one software module;

after loading the at least one software module, running the software module; and wherein the one or more conditions include that a software module in the particular file include a pre-defined string of characters.

23. A computer system for running software modules of an application, the computer system comprising:

a plurality of software modules, each software module of said plurality of software modules being stored in a file that has a file name and that is associated with a file directory;

said computer system configured to select for execution at least one software module of the plurality of software modules that is stored in a particular file:
that is associated with the file directory, and
that has a particular file name satisfying a first criteria;

said computer system configured to verify that the at least one software module satisfies a set of one or more conditions that indicate that said at least one software module is configured to be run by said application;

said computer system configured to load the at least one software module after verifying that the at least one software module satisfies the set of one or more conditions;

said computer system configured to run the software module after loading the at least one software module; and wherein the one or more conditions include that a software module in the particular file include a pre-defined string of characters.

24. A computer system comprising:

an application that resides on the computer system and that includes at least one application driver;

a pool of software modules, wherein said application includes no explicit reference to any software module in said pool;

means for said application driver to select one or more software modules from the pool of software modules;

means for said application driver to determine whether said one or more software modules satisfy a first condition that indicates that said one or more software modules are configured to be run by said application driver;

means for said application driver to, when said one or more software modules satisfy said first condition:
load the one or more software modules, and
execute the one or more software modules; and wherein the first condition includes that said each software module contain a pre-defined string of characters.

25. A computer system for running software modules of an application, the computer system comprising:

a plurality of software modules, each software module of said plurality of software modules being stored in a file that has a file name and that is associated with a file directory;

means for selecting for execution at least one software module of the plurality of software modules that is stored in a particular file:
  that is associated with the file directory, and
  that has a particular file name satisfying a first criteria;

means for verifying that the at least one software module satisfies a set of one or more conditions that indicate that said at least one software module is configured to be run by said application;

means for loading the at least one software module after verifying that the at least one software module satisfies the set of one or more conditions;

means for running the software module after loading the at least one software module; and wherein the one or more conditions include that a software module in the particular file include a pre-defined string of characters.

* * * * *